United States Patent
Cartoni

(10) Patent No.: US 7,331,675 B2
(45) Date of Patent: Feb. 19, 2008

(54) SYSTEM FOR BALANCING THE LOAD FOR HEADS FOR MOTION PICTURES OR TELEVISION SHOOTINGS

(75) Inventor: Guido Cartoni, Rome (IT)

(73) Assignee: Cartoni S.p.A., Rome (IT)

( * ) Notice: Subject to any disclaimer, the term of this patent is extended or adjusted under 35 U.S.C. 154(b) by 312 days.

(21) Appl. No.: 11/099,121

(22) Filed: Apr. 5, 2005

(65) Prior Publication Data

US 2006/0066809 A1 Mar. 30, 2006

(30) Foreign Application Priority Data

Sep. 27, 2004 (IT) .......................... RM2004A0456

(51) Int. Cl.
*G03B 17/00* (2006.01)
*F16M 11/02* (2006.01)

(52) U.S. Cl. ..................................... 352/243; 248/177.1

(58) Field of Classification Search ............. 248/177.1, 248/178.1, 183.1, 183.2, 183.3, 186; 348/373; 352/243

See application file for complete search history.

(56) References Cited

U.S. PATENT DOCUMENTS 4,083,524 A 4/1978 O'Conner et al.
4,732,357 A 3/1988 Lindsay
5,389,972 A 2/1995 Cartoni
6,416,024 B1 7/2002 Lindsay

FOREIGN PATENT DOCUMENTS

FR 2552578 A 3/1985

OTHER PUBLICATIONS

European Search Report, Jan. 26, 2006.

*Primary Examiner*—Rodney Fuller
(74) *Attorney, Agent, or Firm*—Hedman & Costigan PC; James V. Costigan

(57) ABSTRACT

A system of heads that support a camera with a rotation axis allowing rotation along a −90°/+90° arc, with a connecting rod element on one side pivoted in a position eccentric with respect to the rotation axis of the head, and on the other side coupled with a shaped element, the shaped element being pivoted on one side and coupled to the lower part of the connecting rod in a central position, to allow movement, the system further comprising at least a spring element pivoted above and at the bottom coupled with the shaped element in such a way to slide with respect to the same shaped element, while allowing for adjustment of the position of the spring element with respect to the shaped element.

6 Claims, 5 Drawing Sheets

Figure 2:
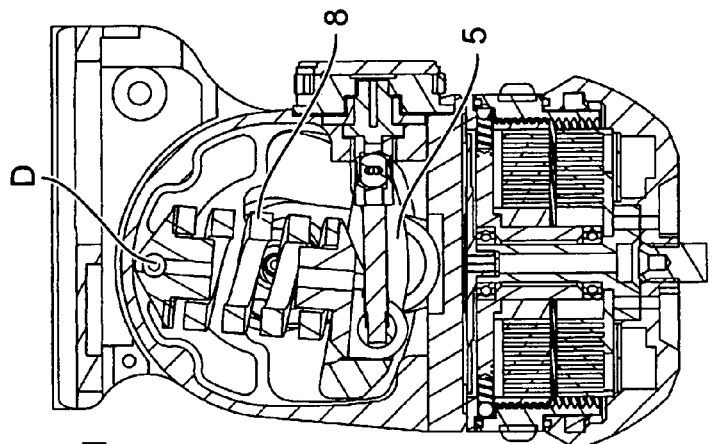

SYSTEM FOR BALANCING THE LOAD FOR HEADS FOR MOTION PICTURES OR TELEVISION SHOOTINGS

The present invention relates to a system for balancing the load for heads for motion pictures or television shootings.

More particularly, the invention relates to a system of the above kind allowing counterbalancing the load (comprised of the image shooting means), weighing down on a support head for motion pictures or television shootings, suitable for weights variable within a wide range on the basis of the kind and dimension of the shooting means, without jeopardising even performances all along the vertical panning shot arc.

In a load counterbalancing system in a support for telecamera or cine-camera, many problems are evidenced that are solved by the present invention.

In order to obtain a homogeneous counterbalancing performance, angular momentum must be annulled by a opposite angular momentum or "reacting" angular momentum, that must have the same and contrary value all along the vertical motion arc −90°/+90°.

In other words, since the position of the barycentre varies for each different angulation of the load, also the reaction necessary to compensate the load must adequate to each different angulation.

Load counterbalancing device must be inserted within a space compatible with the dimensions and the weight of the support that must be proportional to the load to be supported.

Furthermore, the counterbalancing device must be versatile to be used both with very light cameras and with heavy cameras without the use of additional devices that are difficult to be implemented. In fact, the more the capacity load range is broad the more universal is the support.

In view of the above, it is well evident the importance of a solution as suggested according to the present invention providing a system satisfying different needings, among which we can mention:

necessity of homogeneity of the performances for each angular position;
great compactness and versatility of the mechanism that can be provided with the suitable dimensions within small head and heavy supports;
wide operative load capacity range between 0 and the maximum allowed by the dimensions of the head.

Furthermore, the structure of the device according to the present invention is easy to manufacture and industrialize, with the obvious consequent reduction of costs.

These and other results are obtained according to the present invention by an absolutely innovative balancing system, providing a combination of anchorages, designing of the spring(s) and eccentricity value to obtain the above-mentioned results.

It is therefore specific object of the present invention a system for balancing the load for heads for motion pictures or television shootings, said head providing a support for the camera and a rotation axis along the vertical plane allowing the rotation along a −90°/+90° arc, said system comprising a connecting rod element, on one side pivoted in a position eccentric with respect to the rotation axis of said head, and on the other side coupled with a shaped element or wing, said shaped element or wing being pivoted on one side and coupled to the lower part of said connecting rod, in a substantially central position, so as to be able to follow its movement, the system further comprising at least a spring element, pivoted above and at the bottom coupled with said shaped element or wing in such a way to slide with respect to the same shaped element or wing, means being further provided for adjustment of the position of said spring element with respect to said shaped element or wing.

Preferably, according to the invention, said shaped element or wing has a circumference arc profile, having its centre in correspondence of the pivoting point of said spring element.

Always according to the invention, said shaped element or wing has a central groove wherein the free end of said spring element slides.

Still according to the invention, two spring elements can be provided, both acting on the same shaped element or wing.

Furthermore, according to the invention, two shaped elements and one or more spring element can be provided.

Furthermore, according to the invention, said means for adjusting the position of said at least one spring element with respect to said shaped element or wing are comprised of a screw element, provided with a pin acting on the lower free end of said at least one spring element.

Figure 1:
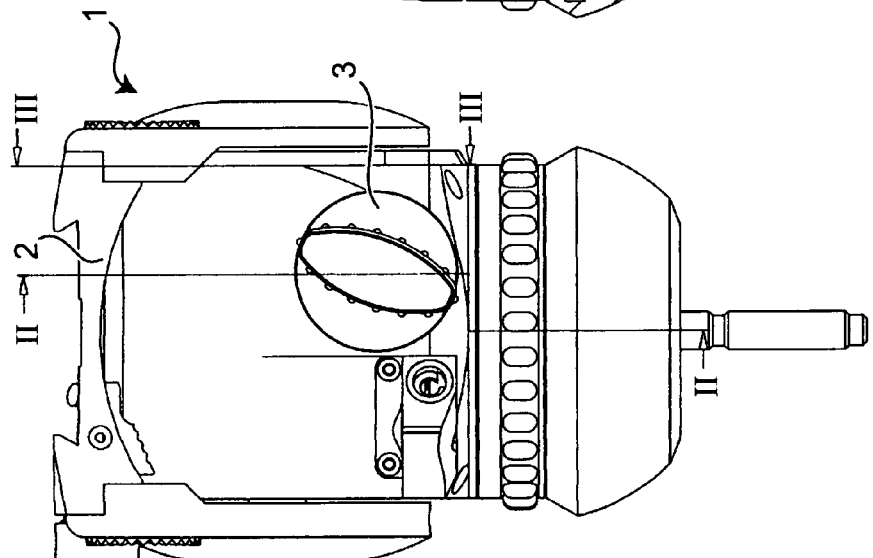
Figure 3:
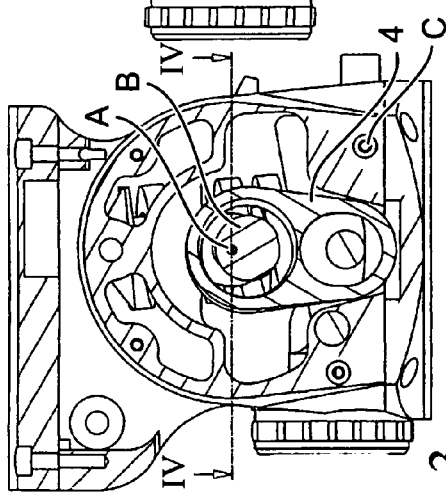
Figure 4:
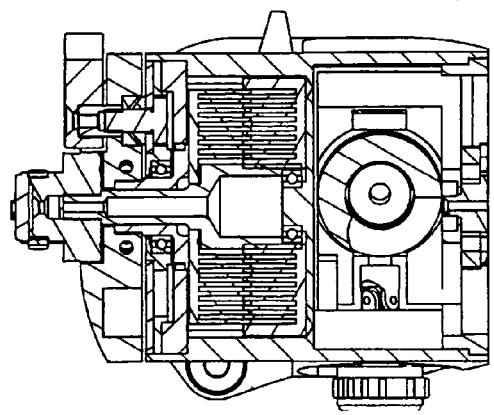
Figure 5:
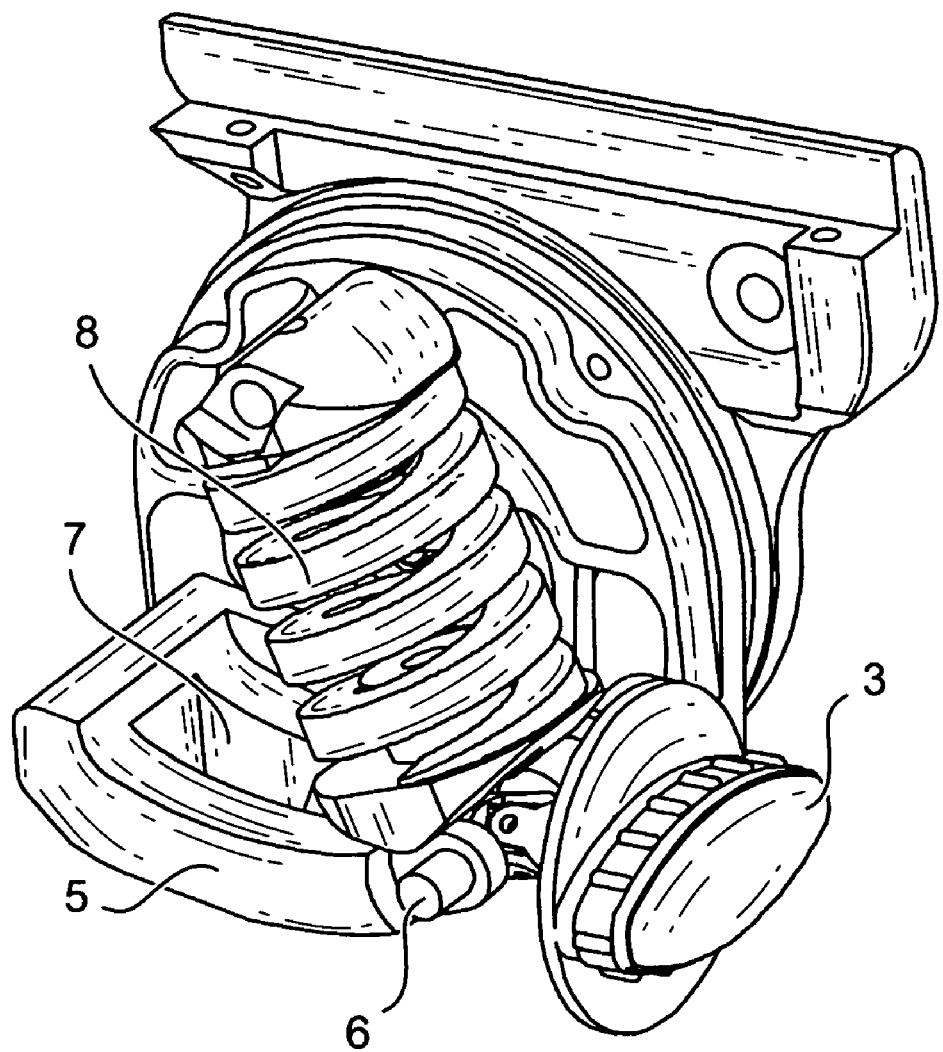
Figure 6:
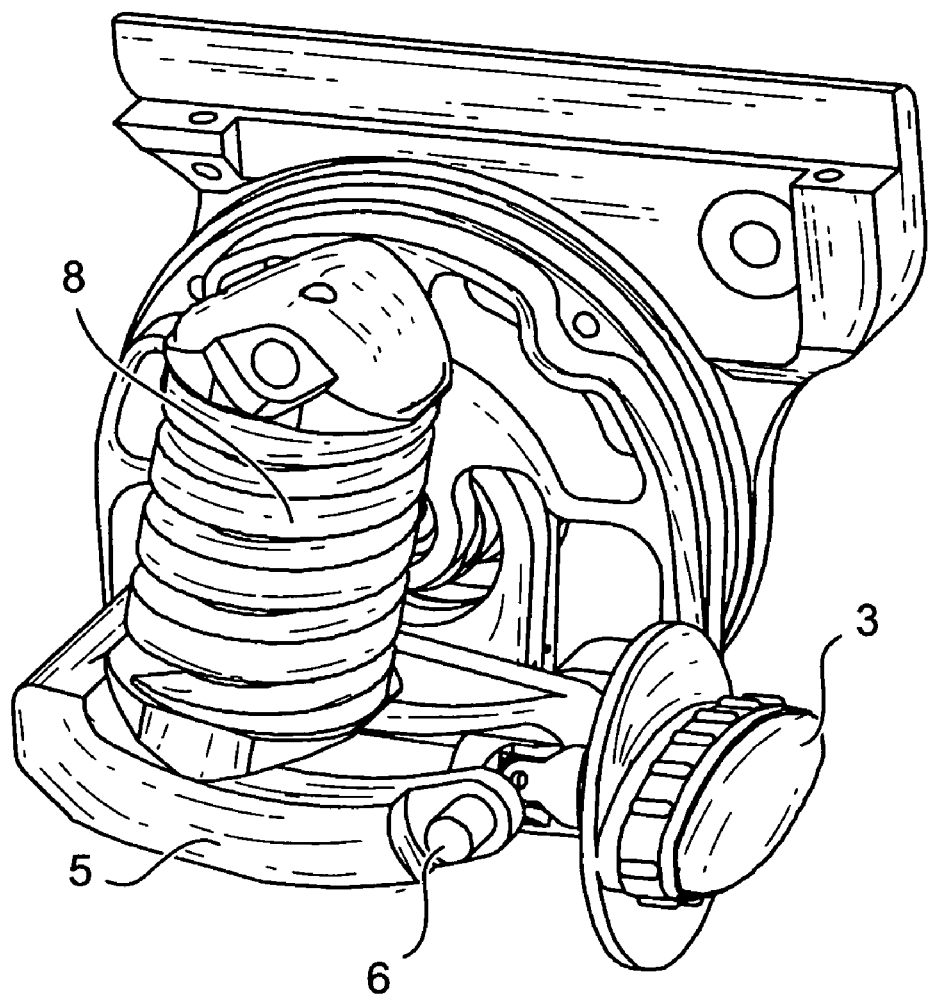
Figure 7:
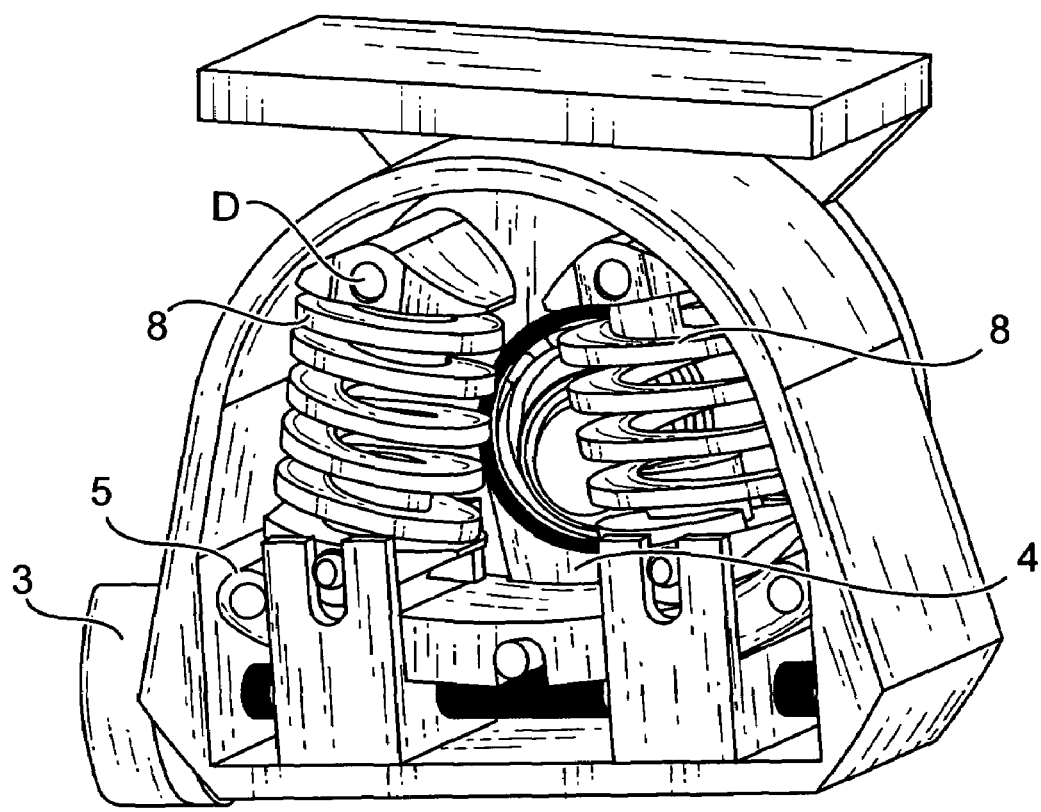
Figure 8:
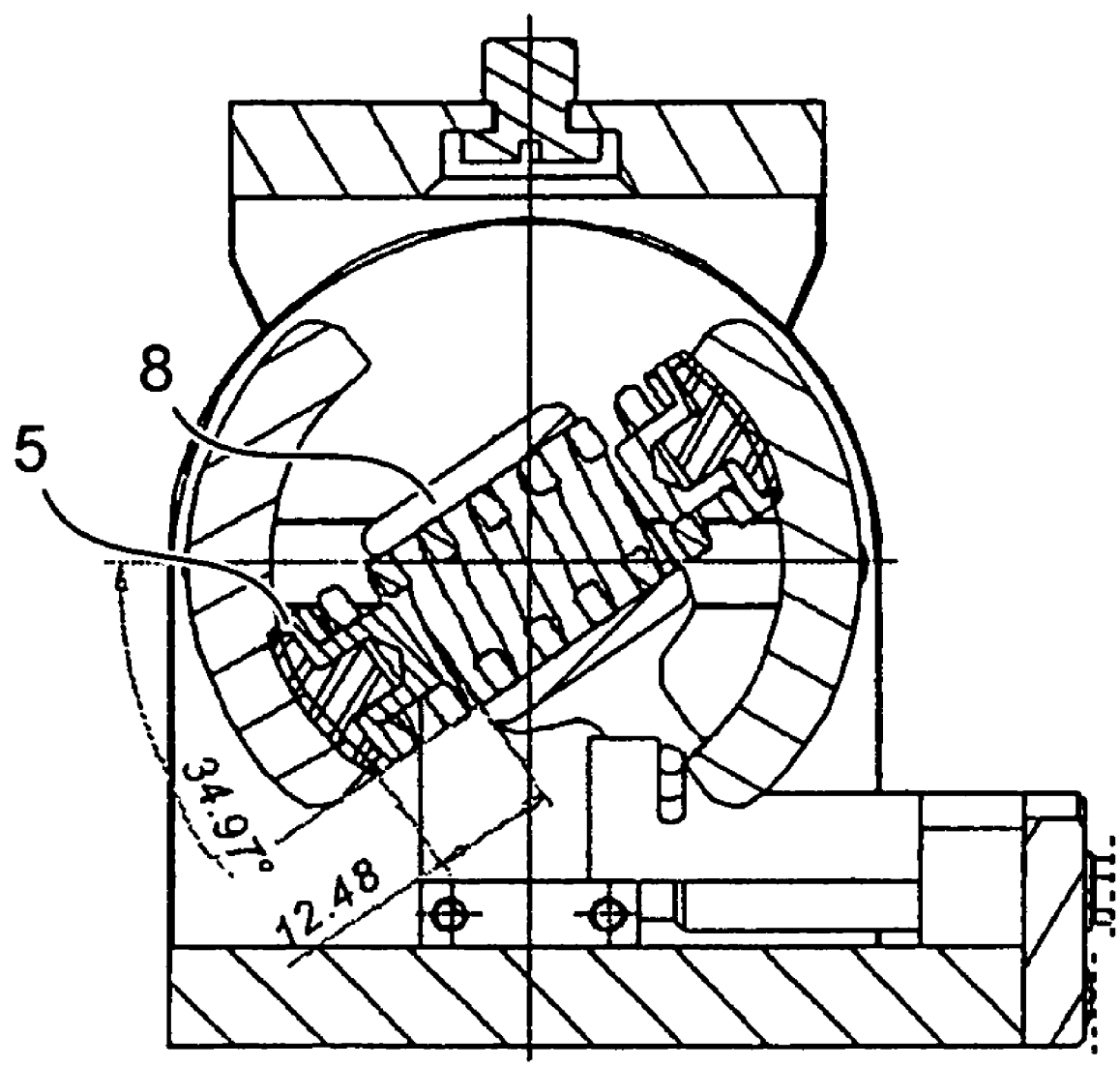

The present invention will be now described, for illustrative and not limitative purposes, according to its preferred embodiments, making particular reference to the figures of the enclosed drawings, wherein:

FIG. 1 shows a head provided with the system according to the invention,
FIG. 2 is a section view taken along line II-II of FIG. 1;
FIG. 3 is a section view taken along line II-III of FIG. 1;
FIG. 4 is a section view taken along line IV-IV of FIG. 3;
FIG. 5 is a perspective view of the system according to the invention in a first position;
FIG. 6 is a perspective view of the system according to the invention in a second position;
FIG. 7 is a schematic view of a second embodiment of the system according to the invention; and
FIG. 8 is a schematic view of a third embodiment of the system according to the invention.

Making reference to the figures of the enclosed drawings, it is shown a head, generically indicated by reference number 1, comprising a support 2 for fixing the camera (not shown), and a screw 3 for adjusting the balancing. At the bottom, the head will be mounted on a tripod (not shown).

Said head 1 allows the positioning of the camera in every position along the vertical axis, by the rotation about the rotation axis A (see FIG. 3). Balancing of displacement of load mounted on the support 2 is obtained according to the invention. Substantially, the system according to the invention, that will be described in the following, allows obtaining in each position a reaction angular momentum balancing and annulling the action angular momentum due to the displacement of the load.

The system according to the invention provides a connecting rod 4, having its rotation centre B in a position eccentric (for example 4 mm) with respect to the rotation centre A of the head.

At the bottom, said connecting rod 4 is coupled with a shaped element or wing 5, that can be clearly seen in FIGS. 5 and 6, said wing 5 having one end pivoted in point C, by the pin 6, while coupling with said connecting rod 4 is such to allow to the same wing to follow the movement of the connecting rod 4.

As a consequence of the connecting rod, eccentricity between two points A and B will vary, said eccentricity in the central position of the embodiment shown in the figures being about 4 mm.

Said wing 5 centrally provides, along a substantially horizontal plane, a groove 7, within which the lower end of a loading spring 8 slides, according to a mode that will be described in greater detail in the following.

Above, said spring 8 is pivoted in point D.

As it can be particularly noted from FIGS. 5 and 6, the system further provides, in correspondence of the adjustment screw 3, an element interacting with the lower part of the spring 8, i.e. on the part of the spring 8 sliding within the groove 7.

Operation of the system according to the invention is very simple. After having placed the camera on the support 2 of the head 1, it is displaced along the vertical plane by the motion along axis A of the head 1, with spring 8 starting from a substantially vertical position with respect to the wing 5 (said position is not essential for the operation of the system).

As already said, wing 5 changes its position on the basis of the movement of the head 1, following the movement of the connecting rod 4.

Acting on the adjustment screw 3, spring 8 is displaced with respect to the wing 5, said wing 5 being shaped as a circumference arc, preferably having the centre in correspondence of the rotation point D of the spring 8. In this way, the load is changed, said load being maximum close to the end of the wing 5 (this position is shown in FIG. 6) and minimum when the spring 8 is close to the pivoting point of the same wing 5 (FIG. 5). The embodiment of the system according to the invention shown in FIG. 7 provides two springs 8 and two wings 5, the operation, including the eccentricity of the rotation between head 1 and connecting rod 4, being the same of the previous embodiment.

A solution providing two springs 8 and two wing profiles 5 can for example be suitable for supporting bigger loads.

The embodiment of the system according to the invention shown in FIG. 8 provides one spring 8 and two wings 5, the operation, including the eccentricity of the rotation between head 1 and connecting rod 4, being the same of the previous embodiment.

As already said in the preceding, the inventive solution is the combination of the provision of anchorages, the dimensions of the spring(s) and the value of the eccentricity.

"Value of the eccentricity" is a constant set on the basis of the design variable of the mechanism.

The present invention has been described for illustrative but not limitative purposes, according to its preferred embodiments, but it is to be understood that modifications and/or changes can be introduced by those skilled in the art without departing from the relevant scope as defined in the enclosed claims.

The invention claimed is:

1. System for balancing the load for heads in motion pictures or television shootings, said head providing a support for the camera and a rotation axis along the vertical plane allowing the rotation along a $-90°/+90°$ arc, said system being characterized in that it comprises a connecting rod element, on one side pivoted in a position eccentric with respect to the rotation axis of said head, and on the other side coupled with a shaped element or wing, said shaped element or wing being pivoted on one side and coupled to the lower part of said connecting rod, in a substantially central position, so as to be able to follow its movement, the system further comprising at least a spring element, pivoted above and at the bottom coupled with said shaped element or wing in such a way to slide with respect to the same shaped element or wing, means being further provided for adjustment of the position of said spring element with respect to said shaped element or wing.

2. System for balancing according to claim 1, characterized in that said shaped element or wing has a circumference arc profile, having its centre in correspondence of the pivoting point of said spring element.

3. System for balancing according to claim 1 or 2, characterized in that said shaped element or wing has a central groove wherein the free end of said spring element slides.

4. System for balancing according to claims 1 or 2, characterized in that two spring elements are provided, both acting on the same shaped element or wing.

5. System for balancing according to claims 1 or 2, characterized in that two shaped elements and one or more spring element are provided.

6. System for balancing according to claims 1 or 2, characterized in that said means for adjusting the position of said at least one spring element with respect to said shaped element or wing are comprised of a screw element, provided with a pin acting on the lower free end of said at least one spring element.

* * * * *